United States Patent
Wang et al.

(10) Patent No.: US 7,554,699 B2
(45) Date of Patent: Jun. 30, 2009

(54) METHOD OF WATERMARK WITH HYBRID HALFTONE DOTS

(75) Inventors: Hsi-Chun Wang, Taipei (TW); Pei-Chi Hsiao, Shangzhu Village (TW); Chi-Ming Lien, Xinzhuang (TW)

(73) Assignee: National Taipei Normal University, Taipei (TW)

( * ) Notice: Subject to any disclaimer, the term of this patent is extended or adjusted under 35 U.S.C. 154(b) by 645 days.

(21) Appl. No.: 11/175,203

(22) Filed: Jul. 7, 2005

(65) Prior Publication Data

US 2006/0170974 A1   Aug. 3, 2006

(30) Foreign Application Priority Data

Jan. 28, 2005   (TW) .............................. 94102581 A (51) Int. Cl.
*H04N 1/405*   (2006.01)
(52) U.S. Cl. ..................................... 358/3.28; 358/3.09
(58) Field of Classification Search .................. 358/1.9, 358/2.1, 3.28, 3.06–3.07, 3.09–3.12
See application file for complete search history.

(56) References Cited

U.S. PATENT DOCUMENTS

2006/0284411 A1 * 12/2006 Wu .............................. 283/93

OTHER PUBLICATIONS

Hsi-Chun Wang et al. "Watermarking a printed shadow image with hybrid halftone dots", The third workshop on digital archives technologies, p. 223-230, Aug. 5-6, 2004.

* cited by examiner

*Primary Examiner*—Thomas D Lee
*Assistant Examiner*—Stephen M Brinich (57) ABSTRACT

A method of watermark with hybrid halftone dots that is suitable for a printed shadow image. The watermark patterns that are composed of amplitude modulation (AM) and frequency modulation (FM) halftone dots (their concentration has been calibrated) cannot be perceived beyond a certain distance by the human eye. This is done through outputting the density calibration chart to choose the proper density parameters, which are applied to the manufacture process of the watermark with hybrid halftone dots. The hidden patterns of a watermark need to be pre-processed first, and thereby making the image blocks of AM and FM halftone dots to be combined smoothly. The copy machine, the lenticular lens and the optical scanner can detect the hidden watermark in the printed shadow image. Each secured document possesses a different serial number to achieve the document-version control.

5 Claims, 7 Drawing Sheets

METHOD OF WATERMARK WITH HYBRID HALFTONE DOTS

BACKGROUND OF THE INVENTION

1. Field of the Invention

The present invention relates to a method of hiding data or patterns of a printed shadow image (ground tint of a document), particularly relating to a method of producing or detecting the hidden data or patterns of a printed shadow image.

2. Description of Related Art

With the rapid innovation of digitization, internet network and the advance of the duplication equipment, people can get the duplicated document much more conveniently than before. While people fully enjoy the modern information technology, the issues of the intellectual property right, the copyright management and document security also receive massive attention in recent years. The secured document includes banknotes, checks, identification card, a classified document and an exclusive particularity document of every organization, etc. The security actions, such as the anti-counterfeiting photo, the security printing, and the document authentication, often hide the information in a printed shadow image. The human eye is unable to perceive the hidden information, but it can be authenticated either by simple apparatuses or by machine-readable devices. It serves not only duplication preventing but also version control.

The anti-counterfeiting technology used on the present secured document often utilizes the special materials or the special methods of printing to achieve the anti-counterfeiting purpose, for instance, the fluorescent thread, the intaglio printing, micro prints, windowed security thread and so on. However, control of the special materials is costly and it makes the anti-counterfeiting technologies more and more important. The digital watermarking technology is used to hide (or embed) the hidden information or patterns in an image or a printed shadow images. This technology can authenticate the secure document by detecting the hidden information or pattern, even can trace the unauthorized duplication.

The technology using the microstructures, such as halftone dots, the fine screen line and the micro prints for anti-counterfeiting purposes has been around for a while. This kind of method does not need the use of special printing materials or a special printing method thereby reducing the cost of manufacture. The patterns of watermark are hidden in the microstructure of different sizes of halftone dot that exceeds the discernible ability of human visual system. The secure documents that use this technology to hide information or patterns cannot be distinguished by the human eye beyond a certain distance. However, the originally hidden information or patterns will be revealed after the duplicator makes the insufficient sampling of halftone-dot microstructures. This mechanism can avoid using a copy machine to produce a counterfeit or unauthorized copy.

Currently, there are some anti-counterfeiting technologies of a printed shadow image which using microstructure, for example, using different thickness of screen line, different sizes of halftone dots, different patterns or micro texts to construct the microstructure. The items below can be used for a basis of comparing advantages and shortcomings.

1. The invisibility of a hidden watermark.
2. The detection of the watermark by duplicating a printed shadow image.
3. The convenience and the variety of the watermark detection.

SUMMARY OF THE INVENTION

This main contents of paper was published at the "The third Workshop on Digital Archives Technologies".

The present invention is to provide a method of producing or detecting the hidden words or patterns of a printed shadow image. The described technology not only applies a novel method mixing the amplitude modulation (AM) halftone dots and the frequency modulation (FM) halftone dots to produce a watermark, but also improves the invisibility of hidden watermark and the variety of watermark detection in the related art. The present invention further provides a variety of methods such as the photocopy, the lenticular lens detection, the optical-scanner detection and so on, to detect the hidden patterns thereby improving its utility, practicality and usability in it's industry.

Accordingly, the present invention provides a method of watermark with hybrid halftone dots that is suitable for a printed shadow image. The watermark patterns that are composed of AM and FM halftone dots (their concentration has been calibrated) can not be perceived by the human eye beyond a certain distance. This is done through outputting the density-calibration chart to choose the proper density parameters, which are applied to the manufacture process of watermark with hybrid halftone dots. The hidden patterns of a watermark need to be pre-processed first, and thereby making the image blocks of AM and FM halftone dots to be combined smoothly. The copy machine, the lenticular lens and the optical scanner can detect the hidden watermark in the printed shadow image. Each secured document possesses a different serial number to achieve the document-version control.

The automatic-manufacture manners of the above-mentioned watermark with hybrid halftone dots include the AM halftone dot that has been calibrated in concentration is performed by an 8×8 (or other sized) threshold matrix. But the FM halftone dot that has been calibrated in density is performed by error diffusion. The AM and FM halftone dot are allocated by using a hidden-pattern mask in bi-level.

$$W=(H_1 \cap M) \cup (H_2 \cap \sim M)$$

Where W represents the combined halftone image, M is a bi-level hidden-pattern mask, $H_1$ represents the image of AM halftone dot, and $H_2$ represents the image of FM halftone dot. The above-mentioned density calibration includes making a density-calibration chart. Take the density of AM halftone dot as the background to output the FM halftone dots within a certain range of density, then the human eye or a video camera recognizes the best matching parameters that have the optimal hidden effect. These matching parameters are suitable under such output conditions and recommended by the present system.

The pre-processing of hidden pattern mask includes that the hidden-pattern boundary of the combined image may produce a result with discontinuous white or block edge, thereby reducing the invisibility effect. The reason of its occurrence is that the 8×8 threshold matrix (or other sized) produced by AM halftone dot can not match the hidden-pattern mask, thereby causing the producing unit of AM halftone dot been torn.

Therefore, the pre-processing of the hidden-pattern mask for achieving a better-hidden effect is necessary. Since the size of AM halftone dot is larger than FM halftone dot, the hidden-pattern mask needs to be pre-processed by the matrix of size 8×8 (or other sized). Thus the artifact on the hidden-pattern edge will not occur, thereby causing the manufacture process of the hidden-pattern watermark become more automatic and there is no need of modifying the un-smooth part of the hidden-pattern boundary.

Furthermore, by integrating the digital-printing technology, producing printed shadow images with different serial numbers become more easily thereby achieving the objective of document-version control.

The above-mentioned methods of detection further comprise using a optical scanner or a copy machine that can produce the differences in sampling between two kinds of halftone dots, therefore the watermark patterns are detected; the hidden patterns can also be seen by using a proper-scale lenticular lens without re-sampling by other equipment, thereby having advantages of fast and convenient authentication.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Hereinafter, embodiments are described for specifying the present invention, and detailed description will be provided with reference to the accompanying drawings for better understanding of the invention. However, the embodiments of the present invention may be modified in various ways, and it should not be interpreted that the scope of the invention is limited to the embodiments described below. The embodiments of the invention are provided just for clearer and more definite illustration to those having ordinary skill in the art. In the drawings, the same reference numeral designates the same element.

Please refer to FIGS. 1 to 14. The workflow of hidden data or patterns of a printed shadow image of the present invention is as follow. Two gray-scale images are produced with proper density in AM block 1 and FM block 11. These two gray-scale images produce AM halftone image in AM block 1 by the threshold matrix, and produce FM halftone image in FM block 11 by error diffusion, respectively. By combining the hidden-pattern mask (that has been processed by AM block 1 and FM block 11) with the AM and FM halftone images, the hybrid halftone dots (the combined image of digital watermark 2) are then performed.

Due to the limited tone which the output device can reproduce, a contone image has to be displayed by a bi-level image (inked and not inked). And the human visual system possesses the ability to integrate the neighboring halftone dots; the human eye then perceives these discrete halftone dots as a contone one. Therefore, the output device cannot reproduce the contone image directly, and halftoning technique is needed to make the printed image close to the original image tone. The halftoning uses dots with the same distances but different sizes (or the same sizes but different distances) to represent the original gray image. The former halftoning is called amplitude modulation (AM) halftoning, and the latter one is called frequency modulation (FM) halftoning. With the advance of computer technology, digital halftoning become a procedure to produce of bi-level image composed by 0 (white, not inked) or 1 (black, inked) from original 0-255 gray-scale image. The gray-scale value 0 represents true black in a digital file. A larger gray-scale value is more close to white color. A gray-scale value 255 represents true white; however, the definition of 1 after digital halftoning is black (inked). Therefore the dot-area percentage is in inverse ratio to the gray-scale value of the original image. That is, if the gray-scale value is larger, the transferred dot-area percentage is smaller. For the amplitude modulation (AM) half-tone dot, if the gray-scale value is larger, the halftone dot is smaller; for the frequency modulation (FM) halftone dot, if the gray-scale value is larger, the half-tone dot is fewer. The amplitude modulation (AM) halftone dot is usually made by ordered dithering, this method is in accordance with the content of threshold matrix, thereby defining the shape of halftone dots and the tones which can be reproduced after quantizing the gray-scale value of original image. If the threshold matrix is 8×8 and its content is arranged from 1 to 64, the threshold matrix will quantize 256 (0-255) tones of the original image to 65 (0-64) tones. Different threshold matrices can produce different halftone images. Since the amplitude modulation (AM) halftone dots are performed in different sizes but specified location, while doing color halftoning, the halftone dots of different colors will interference with each other; then the phenomena of moiré arise. Therefore, the threshold matrices with different screen angle are necessary. Using different screen angle for different colors will ease the effect of moiré. The halftoning image formed by threshold matrix at screen angle of 45° is most pleasant for the human visual system. Therefore, in table 1, an 8×8 threshold matrix for halftoning at screen angle of 45° for present invention is listed.

TABLE 1

| 35 | 49 | 41 | 33 | 30 | 16 | 24 | 32 |
| 43 | 59 | 57 | 54 | 22 | 6  | 8  | 11 |
| 51 | 63 | 62 | 46 | 14 | 2  | 3  | 19 |
| 39 | 47 | 55 | 38 | 26 | 18 | 10 | 27 |
| 29 | 15 | 23 | 31 | 36 | 50 | 42 | 34 |
| 21 | 5  | 7  | 12 | 44 | 60 | 58 | 53 |
| 13 | 1  | 4  | 20 | 52 | 64 | 61 | 45 |
| 25 | 17 | 9  | 28 | 40 | 48 | 56 | 37 |

Figure 1:
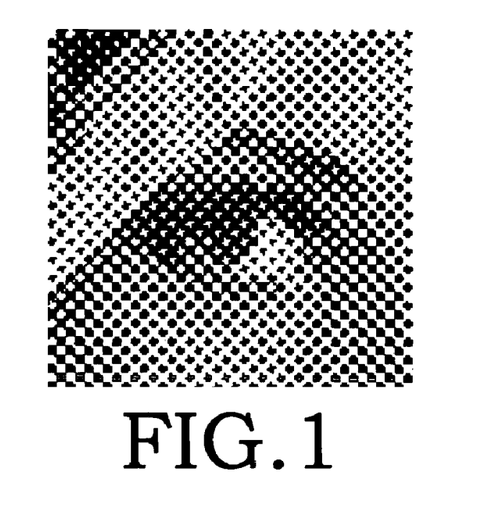
FIG. 1 is a schematic diagram, which shows a halftone image generated by a threshold matrix for amplitude modulation (AM) at screen angle 45°.

FIG. 1 is a schematic diagram, which shows using a threshold matrix for amplitude modulation (AM) halftoning at screen angle of 45°.

The frequency modulation (FM) halftone dot is normally produced by error diffusion, and its bi-level processes is as follow:

if $(1-G_2/Gmax)>T$ then $H_2=1$ else $H_2=0$ $G_2$ is the image with original gray-scale value, and Gmax is the maximum gray-scale value 255. T is a const threshold value, which is chosen 0.5 normally. For example, if $G_2$ is 51, then the $(1-G_2Gmax)$ will be 0.8 and be larger then T. The image $H_2$ after halftone screening should be 1 (a black dot). The quantization error (1−0.8=0.2) will be diffused to the neighboring pixels, and a proper matrix is chosen to distribute the weightings of error diffusion, as follows:

$$\frac{1}{16}\begin{bmatrix} 0 & 0 & 0 \\ 0 & -16 & 7 \\ 3 & 5 & 1 \end{bmatrix}$$

Figure 2:
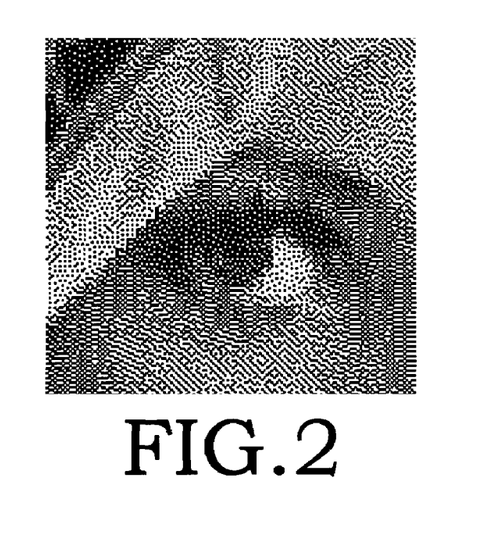
FIG. 2 depicts a schematic diagram, which shows a halftone image for frequency modulation (FM) by error diffusion.

The frequency modulation (FM) halftone dot that is formed by error diffusion uses single pixel as the basic unit; accordingly, its resolution is higher than the amplitude modulation (AM) halftone dot whose dithering is formed by using the size of the threshold matrix as the basic unit. Many ink-jet printers use the error diffusion algorithm to do halftoning nowadays. By close-up of the bright area of the image, the halftone dots are fewer; but the halftone dots are more concentrated in the dark area. FIG. 2 depicts a schematic diagram for the image of frequency modulation (FM) halftone dot performed by error diffusion.

After the gray-scale images have been processed by different halftoning methods, we can get two halftone images of AM and FM, which are denoted as $H_1$ and $H_2$ respectively. If the hidden-pattern mask is denoted as M, the combined image W can be computed (black dot is 1, white dot is 0) by the following logical operations:

$W=(H_1 \cap M) \cup (H_2 \cap \sim M)$

Figure 3:
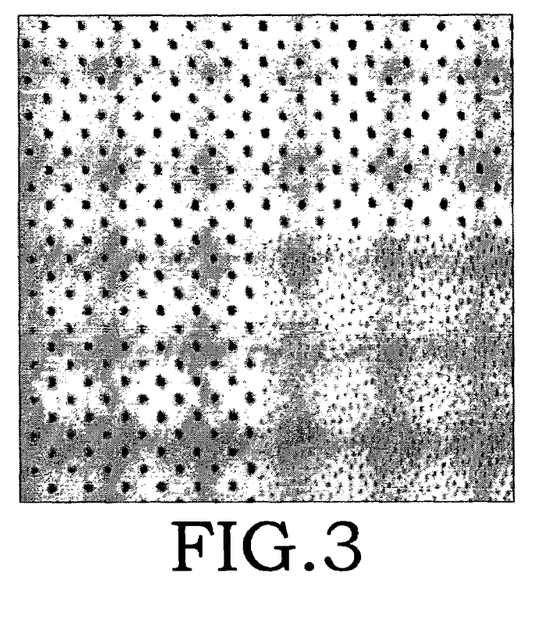
FIG. 3 depicts a microscopic image of the watermark with hybrid halftone dots.
Figure 4:
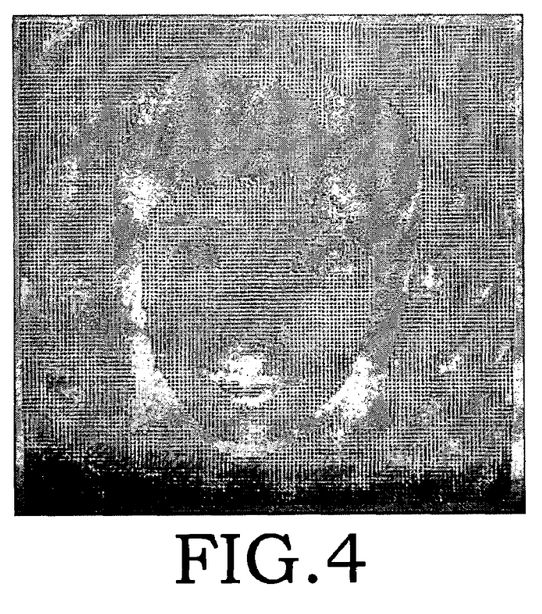
FIG. 4 depicts a diagram, which shows the discontinuous boundary of the hidden-pattern mask that has not been pre-processed.
Figure 5:
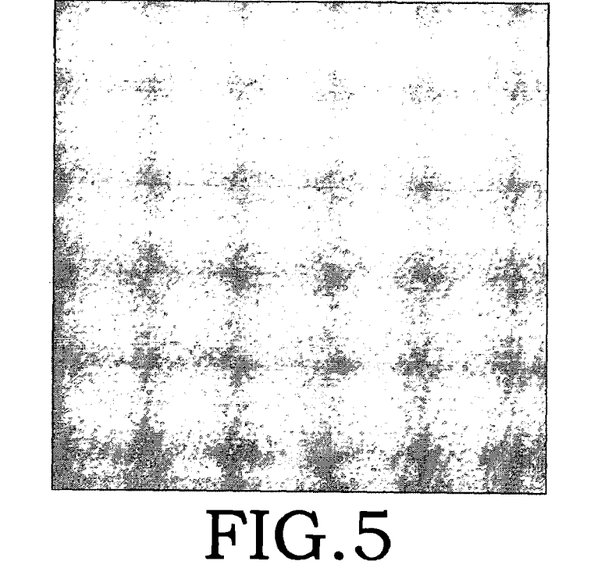
FIG. 5 depicts a diagram, which shows the smooth boundary of the hidden-pattern mask that has been pre-processed.

The microscopic image produced by the above mentioned watermark with hybrid halftone dots is showed in FIG. 3. The hidden-pattern mask which has not been modified by pre-processing is showed in FIG. 4, and the boundary of the hidden pattern possesses discontinuous white or block edge, thereby degrading the invisibility of the digital watermark.

Due to the 8×8 (or other size) basic unit used by AM halftoning, therefore, the hidden-pattern mask need to be pre-processed to fit the basic unit of the halftone dot, thereby avoiding the discontinuous white or block edge of hidden-pattern boundary. The hidden watermark image that has been preprocessed is showed in FIG. 5, and this hidden pattern cannot be perceived beyond a certain distance.

In the calibration chart of halftone dot density, the problem of the dot gain while printing needs to be considered. The effect of dot gain means the differences between the specify coverage of the halftone dots and printed ones. The areas of printed dots are usually larger than the specify ones, and the levels of dot gains are different according to the various sizes of dots, the shapes of dots and the substrate materials of printing. In order to hide the hidden pattern into the hybrid halftoning print, the dot gain effect need to be calibrated. The present invention also designs a digital calibration chart that is suitable for watermark with AM and FM hybrid halftone dots, to adjust the differences between the various output devices and substrate materials. This chart is applied to choosing proper matching parameters quickly, and then print out the shadow image with watermarks efficiently.

Figure 6:
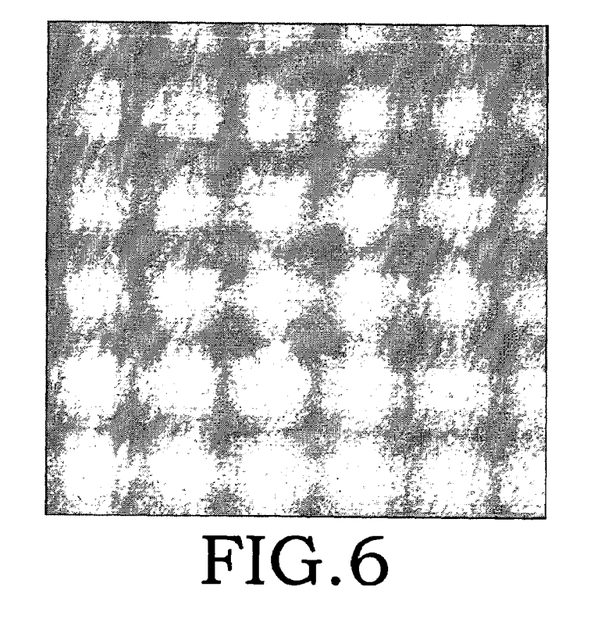
FIG. 6 depicts a printed image by the gray-scale value calibration chart in table 2 while using the AM halftone dot area percentage of 3% as the background, the match parameter of the gray-scale value of the FM halftone dot is 221 or 220.

To make a density-calibration chart: Take the density of AM halftone dot as the background basis to match the FM halftone dots within a certain range of density, then use the human eye or a video camera to recognize the matching parameters that have the optimal hidden effect. These matching parameters are suitable and adaptive under such kind of output condition and recommended by the present system. As in table 2, when the dot percentage of the AM halftone dot is 3%, the present gray-scale values of the original FM halftone dot are 244, 243, 242 . . . 220 from upper left to bottom right, and the image resolution is 720 dpi. The output chart is shown in FIG. 6, and it has the optimal match parameters when the density of FM blocks of gray-scale values and the density of background AM halftone dots are showing consistency. Under this specific output condition, with the AM halftoning dot area percentage of 3%, the original gray-scale value of the match FM halftone dot is 221 or 220.

TABLE 2

| 244 | 243 | 242 | 241 | 240 |
| 239 | 238 | 237 | 236 | 235 |
| 234 | 233 | 232 | 231 | 230 |
| 229 | 228 | 227 | 226 | 225 |
| 224 | 223 | 222 | 221 | 220 |

Figure 7:
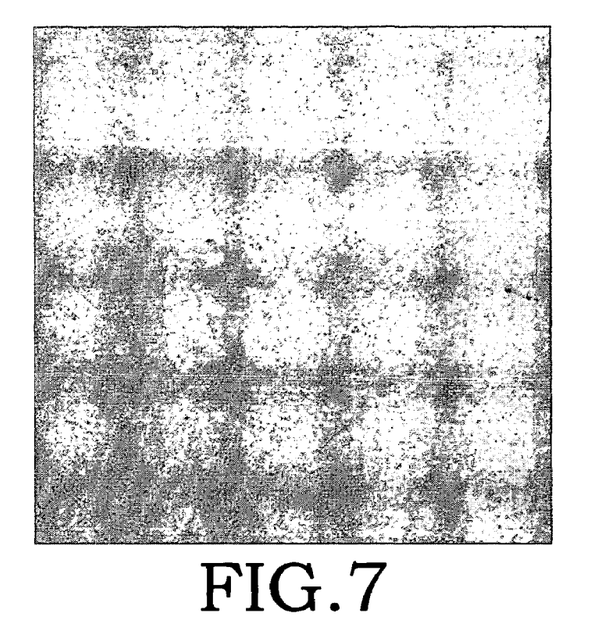
FIG. 7 depicts detecting a watermark by a copy machine.
Figure 8:
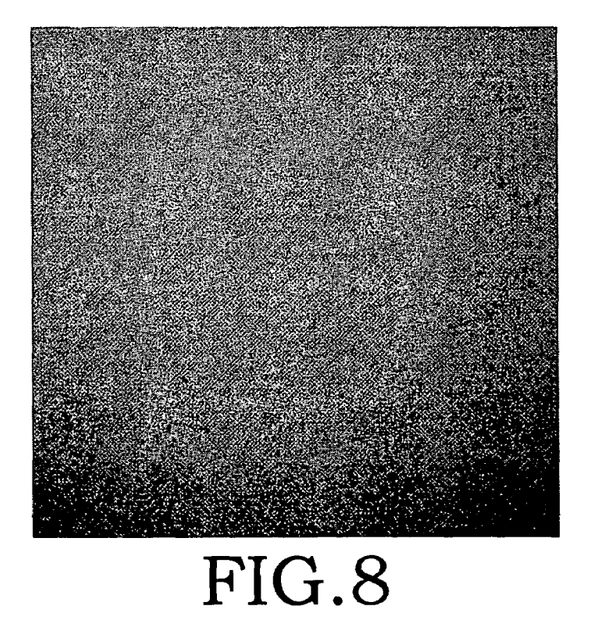
FIG. 8 depicts detecting a watermark by a scanner.
Figure 9:
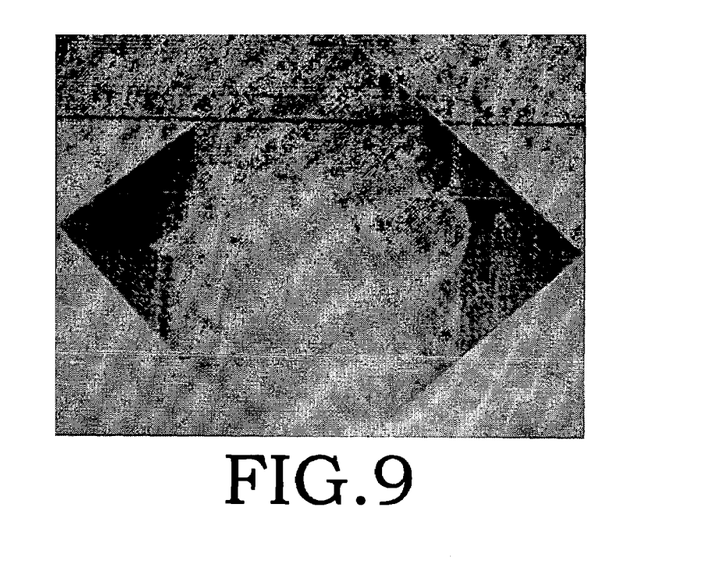
FIG. 9 depicts detecting a watermark by a lenticular lens.
Figure 10:
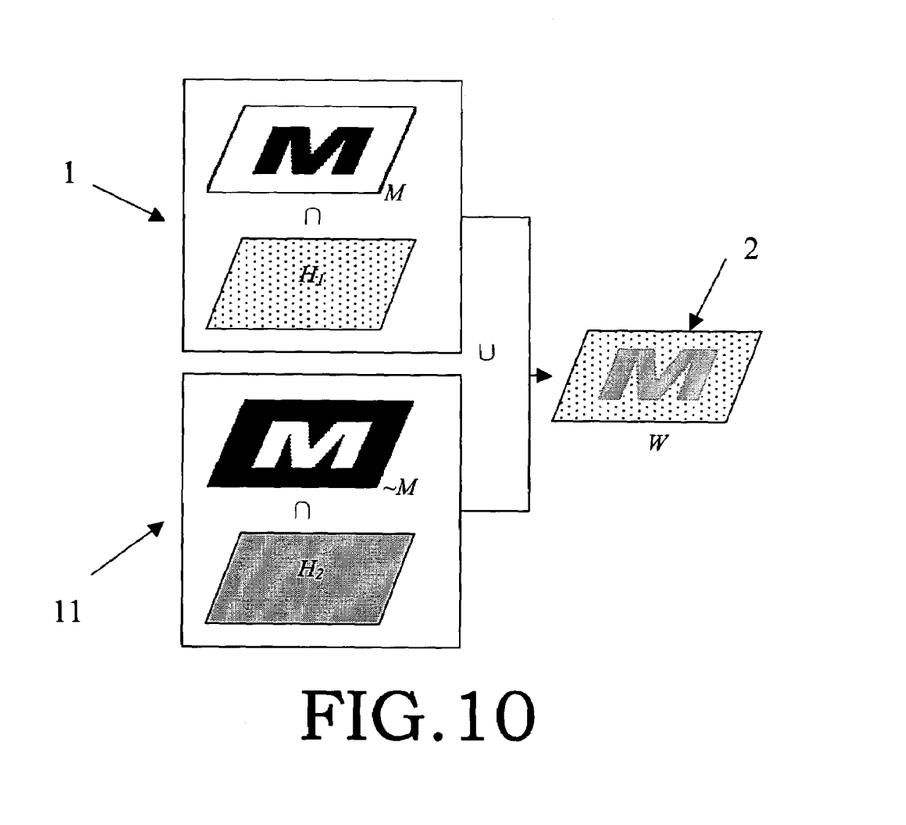
FIG. 10 depicts a schematic diagram which shows the manufacture procedure of watermark with hybrid halftone dots.

The present invention also discloses some methods of detecting hidden patterns. The resolution of the image with hidden watermark patterns is set at 720 dpi; and a printer with 1440 dpi prints out the image. The embodiment takes a normal printer as the output device, and this example is used to describe not to limit the present invention. The watermark can be detected by copy machine. Comparing the present invention to the other technologies, the invisibility of the present invention is better and the contrast of detected (or extracted) watermark is higher. Thus the distinguishing ability is stronger. This is owing to the smaller size of FM halftone dots, the density match of FM halftone dots can be fine-tuned, and the sampling differences between the AM/FM halftone dots can be enhanced during detection, as shown in FIG. 7. Moreover, an optical scanner can highlight the sampling difference between the AM and FM halftone dots (like copy machine), and then the hidden watermarks appear in the situation of under-sampling. FIG. 8 shows the detection result by optical scanner at the sampling of 600 dpi. The third kind of watermark detection method uses a lenticular lens to detect hidden or pattern, and this method uses the lenticular lens at 750 lpi (lines per inch) to detect the encrypted image as shown in FIG. 9.

Figure 11:
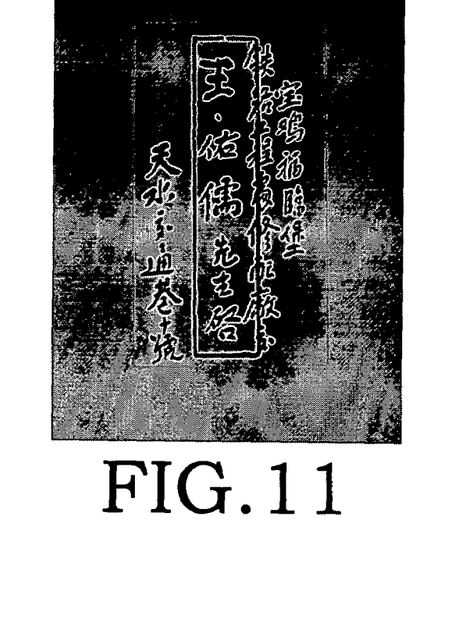
FIG. 11 depicts an example of applying the watermark with hybrid halftone dots to a printed shadow image. The digitally archived document is the front side of an envelope in 1946, and the printed shadow image hides the serial number of "COPIED 19240616" and the school badge of National Taiwan Normal University.
Figure 12:
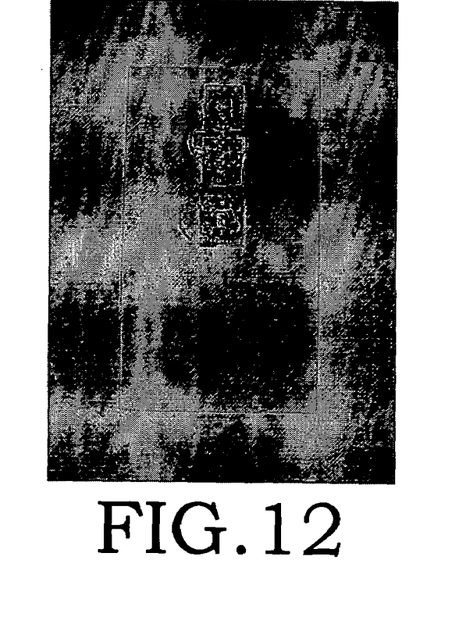
FIG. 12 depicts an example of applying the watermark with hybrid halftone dots to a printed shadow image. The digitally archived document is the back side of the envelope in FIG. 11, and the printed shadow image hides the serial number of "COPIED 20040616" and the school badge of National Taiwan Normal University.
Figure 13:
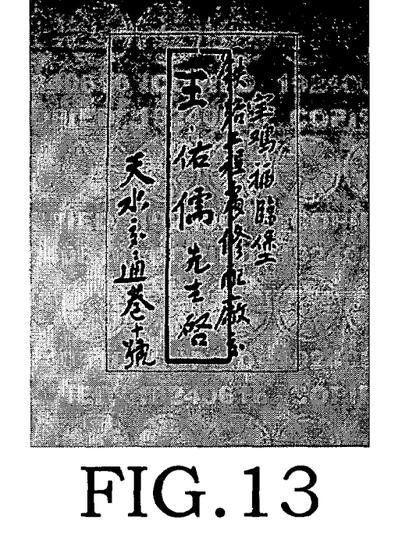
FIG. 13 depicts a duplicated image copied from FIG. 11 by a copying machine.
Figure 14:
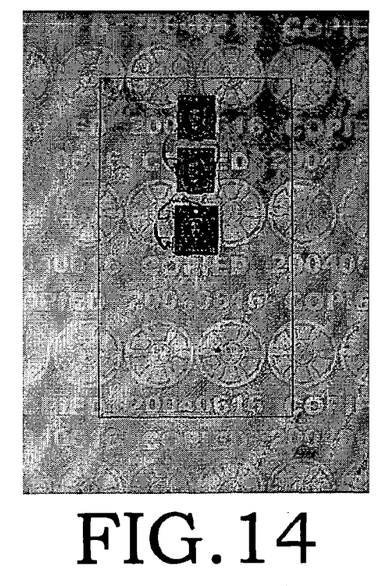
FIG. 14 depicts a duplicated image copied from FIG. 12 by a copying machine. The shadow image reveals the NTNU badge and the hidden-pattern serial number, which is different to FIG. 13; thereby knowing it's an unauthorized copy and identifying the source according to the serial number.

The embodiment of the application of present invention is shown in FIG. 11 and FIG. 12. The authorized digital content is printed out on the anti-forgery printed shadow image that includes watermark with hybrid halftone dots. FIG. 11 shows the front side of an envelope in 1946, and it has been digitalized and printed on the anti-forgery printed shadow image. The printed shadow image hides the serial number of "COPIED 19240616" and the school badge of National Taiwan Normal University. FIG. 12 depicts the back side of the 1946 envelope and it has been output on the printed shadow image with the hidden different serial number of "COPIED 20040616" and the school badge of National Taiwan Normal University. The present invention could take the serial number or special information as hidden patterns. Thus the printed shadow images of each secured document possesses a different serial number to achieve the objective of document-version control. After duplicating these two secured documents in FIGS. 11 and 12, the hidden patterns and the different serial numbers are revealed. This means that these documents are unauthorized copies, and their serial numbers are also revealed, as shown in FIGS. 13 and 14.

Many changes and modifications in the above-described embodiment of the invention can, of course, be carried out without departing from the scope thereof Accordingly, to promote the progress in science and the useful arts, the invention is disclosed and intended to be limited only by the scope of the appended claims.

What is claimed is:

1. A method of making a watermark with hybrid halftone dots, comprising the steps of:
    combining an amplitude modulation (AM) and a frequency modulation (FM) halftone dots through a hidden-pattern mask;
    using the hybrid halftone dots to make a printing with the watermark;
    deciding a density of the AM halftone dot first, then using a calibration chart to choose a corresponding density of the FM halftone dot;
    pre-processing the hidden-pattern mask to achieve a boundary of a combined image to be smooth;
    making a secured document by outputting the watermark in a shadow image whose density of AM/FM halftone dots is forming a hidden pattern becomes visible after duplicating;
    generating hidden patterns of different serial number to achieve a document-version control; and
    detecting a hidden watermark by simple tools.

2. The method of claim 1, wherein the calibration chart of density is produced automatically.

3. The method of claim 1, wherein the hidden watermark is detected by a copy machine.

4. The method of claim 1, wherein the hidden watermark is detected by a lenticular lens.

5. The method of claim 1, wherein the hidden watermark is detected by an optical scanner.

* * * * *

UNITED STATES PATENT AND TRADEMARK OFFICE
CERTIFICATE OF CORRECTION

| | | |
|---|---|---|
| PATENT NO. | : 7,554,699 B2 | Page 1 of 1 |
| APPLICATION NO. | : 11/175203 | |
| DATED | : June 30, 2009 | |
| INVENTOR(S) | : Wang | |

It is certified that error appears in the above-identified patent and that said Letters Patent is hereby corrected as shown below:

On the title page (73)
    The assignee should be --NATIONAL TAIWAN NORMAL UNIVERSITY-- instead of "NATIONAL TAIPEI NORMAL UNIVERSITY".

Signed and Sealed this
Thirty-first Day of May, 2011

David J. Kappos
*Director of the United States Patent and Trademark Office*